May 31, 1966 R. W. EVANS 3,253,701

BIDIRECTIONAL VARIABLE RATE FEEDER

Filed March 11, 1964

INVENTOR.
ROBLEY W. EVANS
BY Marshall, Wilson & Yeasting
—attorneys—

United States Patent Office 3,253,701
Patented May 31, 1966

3,253,701
BIDIRECTIONAL VARIABLE RATE FEEDER
Robley W. Evans, New Albany, Ind., assignor to Rex Chainbelt Inc., a corporation of Wisconsin
Filed Mar. 11, 1964, Ser. No. 351,004
8 Claims. (Cl. 198—220)

This invention relates to vibratory equipment and in particular to a reversible vibratory feeder or conveyor.

Most vibratory conveyors or vibratory feeders are arranged to feed material in a fixed direction that is determined by the direction of the vibration of the trough of the feeder. Occasionally, it is desirable to be able to reverse the direction of feed by simple external controls that may be actuated while the equipment is in operation.

Reversible conveyors have been provided by mechanically varying the inclination of the supporting links of the conveyor from one side of the vertical to the other while the drive for the conveyor operated in a horizontal direction. The change in inclination of the links changed the direction of the vibration thus resulting in the change in direction of flow. This system is unsatisfactory because of the complexity of the mechanism required to effect the change in position of the links.

The principal object of this invention is to provide a structure in which a change in spring rate of certain coupling springs of the apparatus results in a reversal of the direction of conveying of the apparatus.

Another object of the invention is to combine a tuned dynamic vibration absorber with a vibratory conveyor or feeder to control the direction of feeding of material on the conveyor.

A still further object of the invention is to provide a tuned vibration absorber incorporating adjustable air springs for controlling the direction of conveying of a vibratory feeder so that the direction and rate of feed may be controlled by a simple adjustment of air pressure.

More specific objects and advantages are apparent from the following description of a preferred form of the invention.

According to the invention a vibratory conveyor trough is resiliently mounted for vibration in a vertical plane. Vibratory force is applied horizontally to the conveyor and one or more dynamic vibration absorbers are applied to the conveyor, each absorber being adapted to vibrate along an inclined path at an amplitude and phase that is controlled by adjustable springs coupling the dynamic absorber mass to the conveyor. A plurality of struts or cantilever springs extending normal to the path of vibration of the absorber, and thus at an angle to the horizontal, guide the absorber and transmit force to it from the conveyor. The tuning of the absorber causes it to vibrate either in phase or out of phase with respect to the driving force applied to it and thus its motion produces a vertical component of motion of the conveyor trough that is either in phase or out of phase with the horizontal vibration of the trough. In phase motion results in conveying in one direction while out of phase motion results in conveying in the opposite direction. At a certain amplitude of vibration and phase of the absorber the resultant motion results in no conveying of the material on the trough.

A preferred form of the invention is illustrated in the accompanying drawings.

Figure 1:
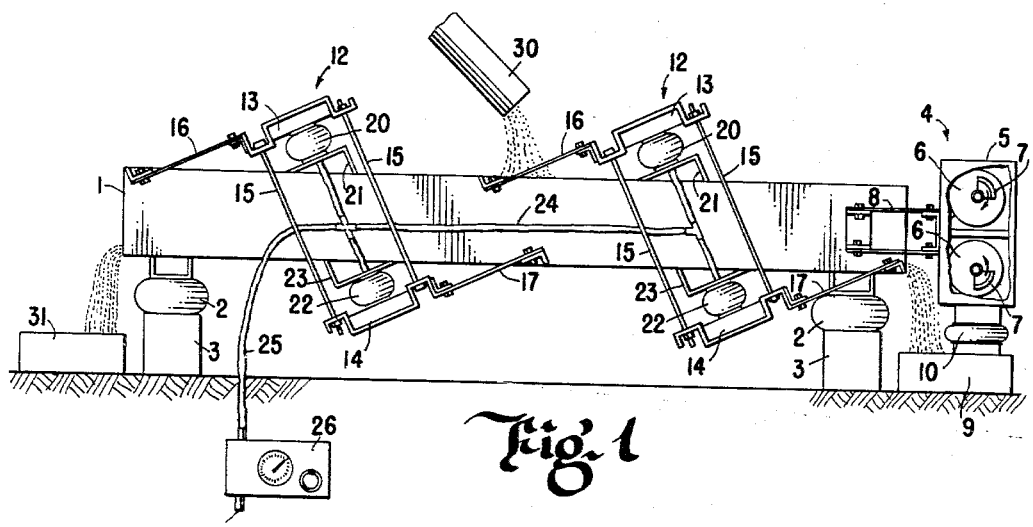
FIGURE 1 is a simplified side elevation of a vibratory conveyor constructed according to the invention.

These specific figures and the accompanying description are intended merely to illustrate the invention and not to impose limitations on its scope.

A bidirectional feeder constructed according to the invention may comprise a feeder trough 1 that is resiliently mounted on isolation springs 2 from pedestals 3 erected from a foundation or base. The isolation springs 2 are preferably low pressure air springs that allow the feeder trough or conveyor 1 to vibrate freely in any plane.

The feeder trough or conveyor 1 is driven horizontally by a vibration exciter 4 that comprises a housing 5 carrying a pair of motors 6 each of which carries unbalanced weights 7 on its armature shaft. The motors 6 are electrically connected to turn in opposite directions as indicated by the arrows. The housing 5 is connected by means of a pair of flexible struts 8 to the end of the conveyor 1. Furthermore, to take the weight of the exciter 4 off the flexible struts 8 the exciter housing 5 is supported from a base 9 by means of a low pressure isolation spring or air spring 10.

The natural frequency of vibration of the exciter housing 5 in a vertical direction in response to the rotation of the unbalanced weights 7 is much lower than the speed of rotation of the weights. Therefore the weights synchronize to exactly balance each other in a vertical direction so that there is little or no resulting vertical vibration of the housing 5. When the weights synchronize in this phase relation they add to produce horizontal vibration of the housing 5 which transmits force through the struts 8 to drive the conveyor 1 in a corresponding horizontal vibration.

In order to convey material on a tuned vibratory conveyor it is necessary that the conveyor have a vertical motion synchronized with its horizontal motion so that the conveyor moves along an inclined path that, in effect, tosses the material along in the desired direction. The vibration exciter 4 provides a horizontal vibration of the trough 1. A vertical component of vibration that is synchronized, either in phase or out of phase, with the horizontal motion to provide a resultant inclined path of movement is provided by a plurality of dynamic vibration absorbers 12, two being indicated in FIGURE 1. Each of the absorbers 12 comprises an upper mass 13 and a lower mass 14 that are connected by tie bolts 15. The upper mass 13 is connected to the conveyor trough 1 by a flexible cantilever spring 16 while the lower mass 14 is similarly connected to the conveyor trough by means of a second cantilever spring 17. In addition, the upper mass 13 is supported from the conveyor by means of an air spring 20 interposed between the mass 13 and a bracket 21 attached to the upper portion of the conveyor trough 1. In like manner the lower mass 14 is connected by means of an air spring 22 to a bracket 23 attached to a lower portion of the conveyor trough 1. The air springs 20 and 22 of each of the absorbers 12 are interconnected by tubing 24 mounted on the conveyor trough 1 and connected through a flexible hose line 25 to a pressure controller 26.

By variation of the air pressure supplied from the pressure regulator 26, the natural frequency of the dynamic absorbers, the weights 13 and 14 on the air springs 20 and 22, may be varied from a frequency which is much lower than the operating frequency of the vibration exciter 4 to a frequency that is much higher than the operating speed. At an intermediate pressure the dynamic absorber becomes resonant at the operating speed. When the pressure in the air line 25 from the pressure regulator 26 is low the air springs 20 and 22 have very low spring rates. Under this condition the conveyor 1 conveys material fed into the conveyor from a chute 30 slowly to the left where it is discharged into a take-away conveyor or trough 31. As the pressure in the air line is increased, to increase the spring rate of the air springs, the amplitude of vibration of the absorber and of the conveyor 1 in the direction of motion of the absorber increases thereby increasing the conveying speed toward the left. When the pressure is reached at which the two-mass system comprising the conveyor 1, the masses 13 and 14, as a mass, and the air springs 20 and 22 as the spring is resonant, the amplitude of vibration of the conveyor becomes quite large and the angle of attack, i.e., the direction of motion of the conveyor trough 1, approximately coincides with the path of motion of the absorber. A further increase in air pressure causes a reversal in phase of the motion of the absorber relative to the vibration exciter 4 but the direction of conveying still remains in the same direction. In fact, the angle of attack increases as the tuning changes from one side of resonance to the other. On further increase in pressure the amplitude of vibration of the absorber decreases thereby decreasing the amplitude of motion of the conveyor 1 while the angle of attack approaches the vertical. When the pressure is such that the absorber itself is resonant the motion of the weights 13 and 14 is fairly large but the motion of the conveyor in the direction of the motion of the weights is zero. Under this condition the angle of attack is parallel to the cantilever springs 16 and 17 and the conveyor conveys material toward the right as seen in FIGURE 1. In fact the conveying toward the right occurs as soon as the air pressure is raised far enough so that the angle of attack swings past the vertical. A still further increase in air pressure causes a slight increase in amplitude of motion of the conveyor trough with the angle of attack becoming less steep.

Figure 2:
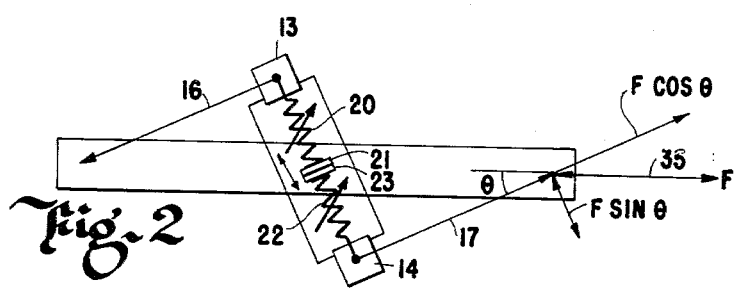
FIGURE 2 is a schematic diagram illustrating the principles of the invention.

This operation may be further explained by considering the forces that are applied to the conveyor and the response of the conveyor to these forces. For the purpose of analysis the conveyor 1 is considered to be a rigid body and the absorbers are considered to be symmetrical with respect to the horizonal center line of the conveyor. Thus, referring to FIGURES 2 and 3 the vibratory force from the exciter 4 is applied horizontally to the end of the conveyor 8 as indicated by an arrow 35 directed to the right. This force may be divided into components $F \cos \theta$ and $F \sin \theta$ acting on the conveyor body in directions parallel and perpendicular to the leaf spring struts 16 and 17.

Since the system is linear the motion in response to that component of the horizontally applied force acting parallel to the cantilever leaf springs 16 and 17 may be computed independently of the response to the component of the applied force acting normal to these springs. Thus in FIGURE 3 a vector F extending to the right along the X axis represents the applied force which is divided into a vector $F \cos \theta$ representing the component of force acting parallel to the length of the cantilever springs and a vector $F \sin \theta$ representing the component of force acting normal to the cantilever springs, i.e., in the direction of the air springs. If $M_1$ is the mass of the conveyor 1 and $M_2$ is the combined mass of the absorber weights 13 and 14 of the several absorbers then, in the direction of the cantilever strut springs 16 and 17 the amplitude of motion X is:

$$X = \frac{F \cos \theta}{W^2(M_1 + M_2)}$$

where W is the operating frequency of the exciter 4 in radians per second. This amplitude of motion of the conveyor 1 in the direction of the struts is indicated by the vector 38. Since the system is assumed to operate at a constant speed and since the cantilever springs 16 and 17 form rigid connections in the direction of their length the amplitude of motion of the conveyor in response to the component of force acting along the springs remains constant with changes in tuning of the air springs.

Figure 3:
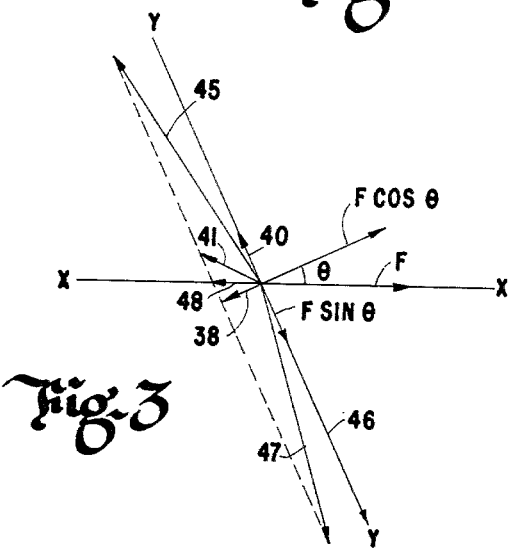
FIGURE 3 is a vector diagram of the forces acting in the system and the motions of the conveyor for various conditions of tuning.

In the direction normal to the springs, i.e., along the line YY of FIGURE 3 the amplitude of motion of the conveyor trough 1 depends upon the tuning of the air springs 20 and 22. When there is no pressure in the air springs so that their spring rate K is zero the motion $X_1$ of the conveyor 1 in the direction of the axis YY is:

$$X_1 = \frac{F \sin \theta}{W^2 M_1}$$

This is indicated by the vector 40 in FIGURE 3. The total motion of the conveyor trough 1 at this tuning is the sum of the individual motions and hence the amplitude corresponds to vector 41 that is the sum of the vectors 38 and 40. The direction of the vector 41 represents the angle of attack at this condition and it is noted that this angle of attack extends upwardly toward the left at a small angle. This provides slow conveying to the left.

Figure 4:
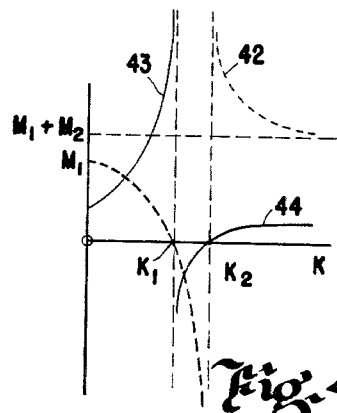
FIGURE 4 is a graph of the mechanical impedance of the system for various conditions of tuning.

Referring to FIGURE 4, the mechanical impedance of the conveyor trough 1, the mass $M_1$, determining the motion of the mass $M_1$ in response to the vibratory force $F \sin \theta$ is shown plotted, as a dotted line, as a function of the spring rate K of the air springs. When K is zero the mechanical impedance is that of the mass $M_1$. As the air springs are inflated so that K takes on larger values the net mechanical impedance decreases and passes through zero when the spring rate equals a value $K_1$, as indicated in FIGURE 4. This is a condition of resonance and the conveyor mass $M_1$ moves in one direction while the absorber masses 13 and 14 move in the opposite direction at large amplitudes of motion. As the air pressure is increased still further the mechanical impedance reverses sign and the force $F \sin \theta$ is then working against an effective spring. The effective spring rate increases with increase in K until at a value $K_2$ the effective spring rate is infinite. This is a condition of resonance at which the dynamic absorbers prevent any motion of the abutments 21, 23 in the direction of motion of the absorber.

As the spring rate K is increased through the value $K_2$ the effective impedance controlling the motion of the conveyor $M_1$ varies suddenly from that of an infinitely stiff spring to that of an infinitely large mass which then decreases with further increase in the value of K along a branch 42 of the curve in FIGURE 4 representing the actual mechanical impedance opposing motion of the mass $M_1$. If the actual spring rate K is increased to infinity, i.e., the air springs become infinitely stiff, the mechanical impedance reduces to that of the sum of the masses $M_1$ and $M_2$.

The actual motion of the conveyor 1 in the direction of the force $F \sin \theta$ is equal to the force divided by the mechanical impedance and is therefore the inverse of the impedance curve shown in FIGURE 4. This is plotted as a solid line curve having branches 43 and 44. The first branch 43 indicates first a small motion of $M_1$ having an amplitude represented by the vector 40 of FIGURE 3 when K is zero. This amplitude increases with increase in K, reaches infinity when K is equal to $K_1$, and then reverses and decreases as indicated by the branch 44 of the curve from minus infinity to zero when the spring rate reaches the value $K_2$ and then again reverses and increases slowly as the actual spring rate K is further increased.

Referring again to FIGURE 3, therefore, as the spring rate K is increased from the value zero the vector 40 increases so that the total motion of the conveyor increases as indicated by a vector 45 which represents the actual motion of the conveyor trough 1 as the spring rate increases from zero to a value less than but approaching a value $K_1$.

As the actual spring rate K is increased to a value slightly greater than $K_1$, the amplitude of motion of the conveyor 1 in response to the force $F \sin \theta$ may be represented by a vector 46 extending downwardly to the right along the YY axis. The total motion of the conveyor 1 at this condition of tuning is represented by a vector 47 which is the vector sum of the vector 38 and the vector 46. It may be noted that the vector 47 is nearly parallel with the vector 45. Thus the motion of the conveyor 1 as represented by the vector 47 is substantially parallel to the motion as represented by the vector 45 thus producing approximately the same angle of attack as far as the material on the conveyor is concerned.

As the value of K is increased the motion of the conveyor 1 in response to the force F sin $\theta$ decreases according to the curve 44 thus indicating that the amplitude of motion decreases at the same time that the angle of attack becomes steeper and steeper. Actually the angle of attack goes through the vertical as the spring rate is increased. When the spring rate reaches the value $K_2$, as indicated in FIGURE 4, the amplitude of motion of the conveyor 1 in response to the force F sin $\theta$ becomes zero and the total motion is that represented by the vector 38. The angle of attack is then directed upwardly to the right at the angle $\theta$. This represents the condition for the conveyor 1 to convey from left to right as seen in FIGURE 1. Any further increase in the value of K beyond the value $K_2$ results in a small increase in amplitude accompanied by a decrease in the angle of attack of the conveyor. In fact if the air springs 20 and 22 were made infinitely stiff the total resulting motion would be that represented by a vector 48 lying in the XX axis.

Inspection of FIGURE 3 indicates that conveying to the left may be readily controlled from a minimum amplitude indicated by a vector 41 when the spring rate is equal to zero, i.e., no air pressure, while the rate of conveying to the left may be increased by increasing the air pressure until maximum allowable amplitude of the conveyor is reached as the spring rate approaches the value $K_1$. Preferably the equipment is designed so that conveying to the left is controlled through a range of low air pressure without approaching the resonant condition. The conveying to the right is controlled by varying the air pressure so that the actual spring rate is somewhere near the value $K_2$. It has been found in practice that the value of theta somewhere in the order of 25 to 30 degrees provides a good compromise between the speeds of conveying to the left and to the right. Also at this value of theta it is also desirable that the total mass of the absorber weights 13 and 14 for all of the absorbers be about 30 percent of the weight of the conveyor 1. This ratio determines the angle of attack of the conveyor when the air pressure is very low and also varies the values of $K_1$ and $K_2$ at which resonances occur. As the mass of the absorber weights 13 and 14 becomes small compared to the weight of the conveyor 1 the resonant air pressures $K_1$ and $K_2$ become closer to each other. The suggested mass ratio of absorber mass equal to 30 percent of the conveyor mass represents a good compromise for this ratio.

FIGURE 3 also indicates that good speed control of conveying varying from zero in either direction in a continuous manner may be provided if the angle theta is increased to a value in the neighborhood of 65 to 70 degrees thus bringing the vector 38 to within 25 to 30 degrees of the vertical and allowing the air pressure to be varied up or down from the pressure giving an effective spring rate $K_2$ so that the angle of attack then varies either side of the vertical without much change in the vertical component of the amplitude of vibration.

Various modification in the actual construction of a bi-directional feeder and in the actual control of the tuning may be made without departing from the spirit and scope of the invention.

Having described the invention, I claim:

1. In a vibratory conveyor, in combination, a conveyor member that is resiliently supported, an auxiliary member, coupling means connected between and supporting the auxiliary member from the conveyor member, said coupling means serving substantially as a strut along a first direction inclined to the conveyor trough and being resilient normal to said first direction, adjustable rate springs connected between said auxiliary member and said conveyor member and acting in a direction generally normal to the coupling means, and means for applying a vibratory force to one of said members along a direction parallel to the length of the conveyor trough.

2. In a vibratory conveyor, in combination, a conveyor member that is resiliently supported, an auxiliary member, cantilever springs supporting the auxiliary member from the conveyor member, at least one adjustable rate spring acting generally normal to the cantilever springs and connecting the members to form a resonant system, means for applying a vibratory force to one of said members along a line generally parallel to the conveyor member, and means for adjusting the spring rate for selectively tuning the system comprising the members and the adjustable spring to resonance above and below the operating speed to select the direction of conveying.

3. In a vibratory conveyor, in combination, a generally horizontal conveyor member that is resiliently supported, an auxiliary member, an inclined strut connecting the members, an adjustable rate spring extending generally normal to the inclined strut and connecting the auxiliary member to the conveyor member, means for applying a horizontal vibratory force to at least one of the members to produce horizontal vibration at a substantially fixed frequency, said inclined strut transmitting force between said members a component of which force acts in the vertical direction, and means for varying the spring rate of said adjustable rate spring to vary the amplitude and phase of the vibration of said auxiliary member relative to the conveyor member to select the direction and speed of conveying of material on the conveyor.

4. In a vibratory conveyor, in combination, a generally horizontal conveyor member that is resiliently supported for vibration in a vertical plane, an auxiliary member, an inclined strut connecting the auxiliary member to the conveyor member with the angle between the strut and the longitudinal axis of the conveyor being less than forty-five degrees, a pneumatic spring extending in a vertical plane approximately normal to the strut to connect the auxiliary member to the conveyor member and form therewith a vibratory system, means for adjusting the air pressure in the pneumatic spring to vary the natural frequency of the vibratory system, and means for applying a horizontally directed vibratory force to one of said members to produce a horizontal vibratory motion of the members, and a force in said struts, said force acting through the strut and adjustable spring to produce vertical motion of said member relative to the auxiliary member.

5. In a vibratory conveyor, in combination, a generally horizontal conveyor member that is resiliently mounted for vibration in a vertical plane, means for applying horizontally directed vibratory force to said conveyor, and an auxiliary tunable system comprising a mass and an adjustable coupling spring coupled to the conveyor member for vibration along a generally vertical path near but not normal to the length of the conveyor member, and a flexible strut extending normal to the path of vibration of the auxiliary system connecting the said mass to said conveyor to transmit driving force to said mass, the resonant frequency of said auxiliary system being adjustable from a frequency below the operating speed to a frequency above the operating speed.

6. In a vibratory system, in combination, a work member resiliently mounted for vibration in a generally vertical plane, means for applying vibratory force to the work member tending to produce vibration along a generally straight line in said plane, an absorber mass, a flexible strut connecting the absorber mass to the work member, said strut being directed at a small acute angle to said generally straight line, and an adjustable rate spring connected from the absorber mass to the work member such that said work member, absorber mass and adjustable rate spring form a vibratory system that is driven by vibratory force transmitted through the strut and that applies a force to the work member that varies in amplitude and phase with respect to the vibration of the work member, whereby the path of vibration of the work member is adjustable.

7. In a vibratory conveyor system, in combination, a conveyor, means for resiliently mounting the conveyor for vibration, an exciter for applying vibratory force to the conveyor generally along its longitudinal axis, an auxiliary mass, means acting in a first direction for coupling the auxiliary mass to the conveyor, means acting in a second direction also coupling the auxiliary mass to the conveyor, said means acting in at least one of said two directions being a spring the spring rate of which is adjustable.

8. In a vibratory conveyor system, in combination, a conveyor, means for resiliently mounting the conveyor for vibration, an exciter system for applying vibratory force to the conveyor, an auxiliary mass, a cantilever spring extending at a small acute angle to the longitudinal axis of the conveyor connecting the auxiliary mass to the conveyor, and an adjustable rate spring acting generally normal to the cantilever spring connecting the conveyor and the auxiliary mass, said spring being adjustable to vary the phase of the movement of the auxiliary mass relative to the conveyor.

References Cited by the Examiner

UNITED STATES PATENTS 2,200,724   5/1940   Robins.

FOREIGN PATENTS 911,895   11/1962   Great Britain.

SAMUEL F. COLEMAN, *Primary Examiner.*

EDWARD A. SROKA, *Examiner.*